(12) United States Patent
Olsen et al.

(10) Patent No.: US 6,612,810 B1
(45) Date of Patent: Sep. 2, 2003

(54) WIND TURBINE BLADE WITH A SYSTEM FOR DEICING AND LIGHTNING PROTECTION

(75) Inventors: Kaj Olsen, Lystrup (DK); Flemming Møller Larsen, Christiansfeld (DK); Peter Grabau, Kolding (DK); John Ellermann Jespersen, Fredericia (DK)

(73) Assignee: LM Glasfiber A/S, Lunderskov (DK)

( * ) Notice: Subject to any disclaimer, the term of this patent is extended or adjusted under 35 U.S.C. 154(b) by 0 days.

(21) Appl. No.: 09/926,806

(22) PCT Filed: Jun. 20, 2000

(86) PCT No.: PCT/DK00/00328

§ 371 (c)(1),
(2), (4) Date: Feb. 6, 2002

(87) PCT Pub. No.: WO00/79128

PCT Pub. Date: Dec. 28, 2000

(30) Foreign Application Priority Data

Jun. 21, 1999 (DK) .......................... 1999 00881

(51) Int. Cl.$^7$ ................................ F03D 11/00
(52) U.S. Cl. ................ 416/95; 416/146 R; 415/4.5; 415/908
(58) Field of Search ................ 416/95, 146 R, 416/229 R, 230; 415/4.3, 4.5, 908; 290/44, 55

(56) References Cited

U.S. PATENT DOCUMENTS

| | | | | |
|---|---|---|---|---|
| 2,742,248 A | * | 4/1956 | Compte et al. | 244/134 D |
| 3,923,421 A | * | 12/1975 | Carter et al. | 416/224 |
| 4,522,889 A | | 6/1985 | Ebneth et al. | |
| 4,944,655 A | | 7/1990 | Merz | |

FOREIGN PATENT DOCUMENTS

| | | |
|---|---|---|
| DE | 196 21 485 | 3/1998 |
| DE | 197 48 716 | 11/1998 |
| DK | 44 28 730 | 2/1996 |
| DK | 1998 00009 | 10/1998 |
| EP | 0 718 495 | 6/1996 |
| SE | 429 279 | 8/1983 |
| WO | WO 96/07825 | 3/1996 |
| WO | WO 98/53200 | 12/1998 |

OTHER PUBLICATIONS

DEFU, "Lynbeskyttelse af Vindmøller Del 7", pp. 1–39, May 1998.
DESITEK A/S, "Overspændingsbeskyttelse", pp. 6–13, 1996.
Culham Laboratory, "A Designer's Guide to the Correct Use of Carbon Fibre Composite Materials and Structures Used in Aircraft Construction, to Protect Against Lightening Strike Hazards", pp. 1–124, Jan. 1990, United Kingdom Atomic Energy Authority, Issue No. 1.

* cited by examiner

*Primary Examiner*—Ninh H. Nguyen
(74) *Attorney, Agent, or Firm*—Nixon Peabody LLP; David S. Safran

(57) ABSTRACT

Wind turbine blade comprises a first (1) and a second (2) electric conductor extending in the longitudinal direction of the blade (25), and one or more electric heating elements (4) for heating the surface of the blade. The heating elements (4) are connected to the first and the second electric conductor. At its tip the wind turbine blade (25) is provided with a lightning receptor 5 for catching lightning, and the lightning receptor (5) is electrically connected to a third (3) conductor earthed so as to be able to carry the current from a stroke of lightning to the earth. The first and the second conductor are connected to the lightning receptor through spark gaps adjacent said lightning receptor and connected to earth through spark gaps adjacent the blade root.

8 Claims, 5 Drawing Sheets

WIND TURBINE BLADE WITH A SYSTEM FOR DEICING AND LIGHTNING PROTECTION

TECHNICAL FIELD

The invention relates to a wind turbine blade comprising a first and a second electric conductor which extend in the longitudinal direction of said blade, one or more electric heating elements for heating the surface of said blade and being connected to the first and the second conductor.

BACKGROUND ART

Wind turbines are often exposed to damaging effects caused by the climatic conditions and the forces of nature. Generally speaking, the invention relates to protection of wind turbines and to be more precise it relates to protection of the wind turbine blades against damaging or undesired effects caused by icing on the surface of the blades and by strokes of lightning.

Icing of aircraft wings is a well-known and severe problem for several reasons. The icing can change the aerodynamic profile of the wing and consequently damage the lift capacity of the wing. Moreover, pieces of ice can break off during the aviation and thereby damage the propellers or the turbine blades. Most places the problem of icing of aircraft wings has been solved by the aircraft being subjected to a spraying with specific chemicals prior to the take-off.

The icing of wind turbine blades has also several negative consequences. The icing can also change the wing profile and consequently the aerodynamic properties of said wing, which has a negative effect on the efficiency. In addition, a non-uniform icing on wind turbine blades can involve a violent asymmetric load on the wind turbine structure, which can result in a breakdown. Finally, pieces of ice shed off the wings present a severe risk to for instance buildings and persons being near the wind turbine. During recent years this problem has been increased because more and more wind turbines are placed in locations suffering from a high risk of icing.

Icing on wind turbine blades can be removed by heating the surface of the blade, and the latter can be carried out in several ways. DE 196 21 485 discloses a wind turbine blade which is internally heated by means of hot air so as to provide a deicing. WO 98/53200 discloses a wind turbine blade which can be deiced by means of heating elements comprising electrically conducting fibres. The heating elements can be arranged on the outside of or embedded in the wind turbine blade. A heating of the surfaces results in a melting of the interface bond between the surface of the wind turbine blade and the ice coating in such a manner that the latter is "shed off" as flakes.

Modern wind turbines are often very large structures towering above the landscape, and many wind turbines are subjected to strokes of lightning every year. A stroke of lightning can involve extremely strong currents of the magnitude 10 to 200 kA within a very short period. Damages caused by strokes of lightning vary from short interruptions of the production due to for instance blown fuses, to severe damages where one or more of the blades are damaged, which in turn can cause damages on the entire structure. During recent years systems for protection of wind turbines against strokes of lightning have accordingly been developed.

WO 96/07825 discloses a lightning protection system for wind turbine blades, where the blade tip has been provided with a so-called lightning receptor of electrically conducting material. This lightning receptor can "catch" a stroke of lightning and lead the lightning current downwards through a lightning down conductor which extends in the longitudinal direction of the blade and which is earthed through the wind turbine hub. This system proved to provide a particularly efficient protection.

BRIEF DESCRIPTION OF THE INVENTION

The object of the invention is to provide a device which in a simple, inexpensive and reliable manner protects a wind turbine blade against both icing and strokes of lighting.

The wind turbine blade according to the invention is characterised in that said wind turbine blade is provided with a lightning conductor system known per se and comprising a lightning receptor at the tip of the wind turbine blade and a third electric conductor electrically connected to said lightning receptor, and which is earthed at the blade root, and that the first and the second conductor are connected through spark gaps adjacent the lightning receptor to said lightning receptor and are earthed through spark gaps at the blade root. As a result a wind turbine blade is obtained which can be deiced, and where the blade and the heating elements are efficiently protected against strokes of lightning, the lightning current primarily being carried to the ground through the third conductor and at formation of electric arcs in the spark gaps secondarily being carried to ground through the first and the second conductor. The potential difference across the heating elements is always zero during the stroke of lightning and thus no damaging strong currents pass through said heating elements.

According to a preferred embodiment of the invention the first conductor adjacent the blade root is connected through an overvoltage cutout to a first current phase, and the second conductor adjacent said blade root is connected to a second current phase through an overvoltage cutout. As a result, an efficient protection of the power supply is obtained because the overvoltage cutouts interrupt the electric connection between the power supply and the first and the second conductor, respectively, in case of strokes of lightning.

According to an advantageous embodiment of the invention the heating elements are placed externally on the surface of the blade. As a result, it is not necessary to change the blade structure because the strength of said blade is not reduced by such a positioning.

According to another embodiment of the invention, the heating elements are laminated into the blade material, whereby the surface properties of the wind turbine blade and consequently the aerodynamic properties of said blade remain unaffected.

The heating elements are preferably made of a metal foil with the result that a uniform heating of the surface of the wind turbine blade is obtained. Such a metal foil can also be glued onto the surface of the wind turbine blade without considerably changing the aerodynamic properties thereof.

According to an embodiment, the first and the second conductor may be arranged in the wall of the wind turbine blade and the third conductor may be inserted in a cavity in said blade. As a result a small interspaced is ensured between the heating elements and the first and the second conductor, respectively.

The heating elements are preferably arranged at the front rim of the blade because the icing often starts here during the operation of the wind turbine.

The wind turbine blade according to the invention may comprise a pivotal tip, where at least a portion of the first and the second conductor extends into said pivotal tip and is connected through resilient contact members to the portion of the same conductor extending in the remaining blade portion, and where spark gaps can be provided parallel to each contact member between the two portions of the As a result, an electric connection is obtained between the portions of the first and the second conductor extending in the tip and the remaining blade, respectively, while the contact members are simultaneously protected against lightning current and consequently the risk of a welding together because said lightning current passes through an electric arc in the spark gaps. As a result a simple and efficient protection of the wind turbine blades with a pivotal tip against icing and strokes of lightning is obtained.

BRIEF DESCRIPTION OF THE DRAWINGS

The invention is explained in greater detail below by means of preferred embodiments illustrated in the drawing, in which.

BEST MODE FOR CARRYING OUT THE INVENTION

Figure 1:
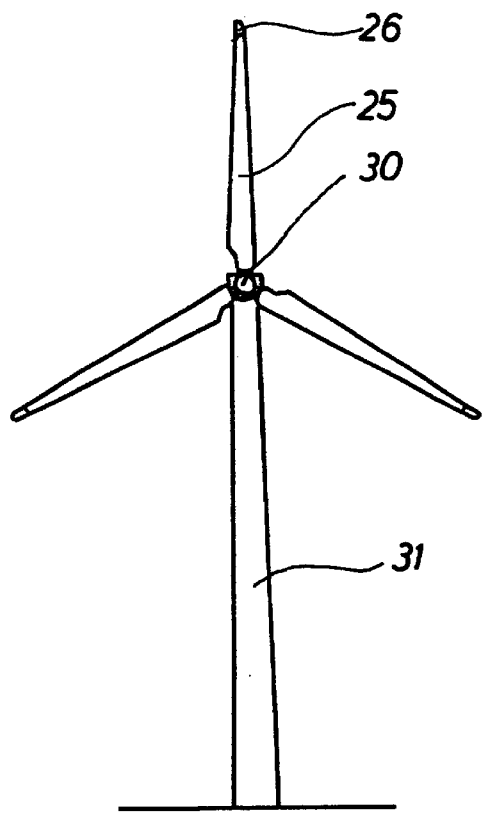
FIG. 1 is a front view of a wind turbine.
Figure 2:
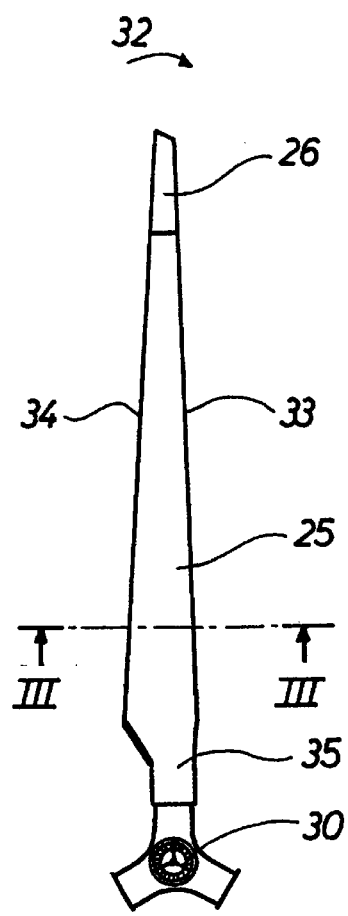
FIG. 2 is a front view of a wind turbine blade and a wind turbine hub.

The wind turbine shown in FIG. 1 comprises essentially a tower 31, a wind turbine hub 30 and three blades 25, which in the illustrated embodiment are provided with a pivotal tip 26. The tip 26 can be turned 90° relative to the remaining portion of the blade and operate as an air brake. FIG. 2 illustrates on a larger scale one of the wind turbine blades 25. The portion of the blade 25 adjacent the hub 30 is called the blade root 35. During operation of the wind turbine, the blade turns in a direction of the arrow 32. The rim positioned in front in the direction of rotation is called the front rim 33, and the rim positioned at the back in said direction of rotation is called the rear rim 34.

Figure 3:
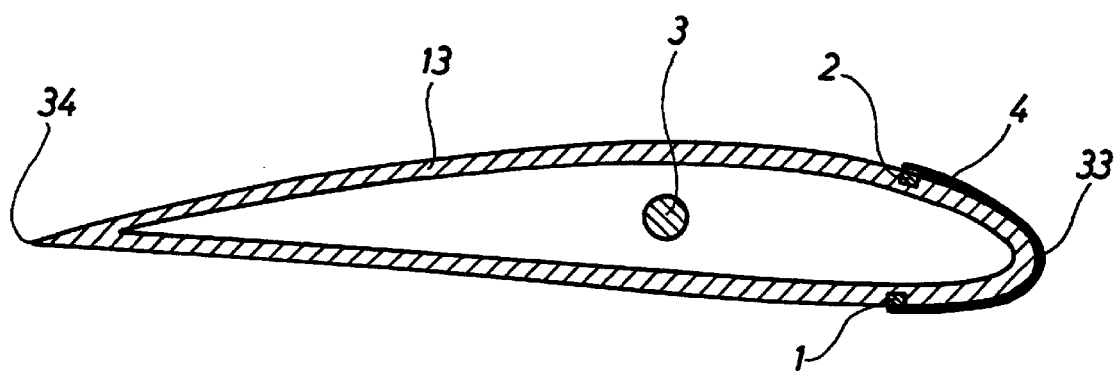
FIG. 3 is a cross sectional view through a preferred embodiment of a wind turbine blade according to the invention.

FIG. 3 is a cross sectional view taken along the line III—III through the wind turbine blade of FIG. 2. The blade is a monocoque construction with an internal cavity. The details shown in FIG. 3 will be explained below.

Figure 4:
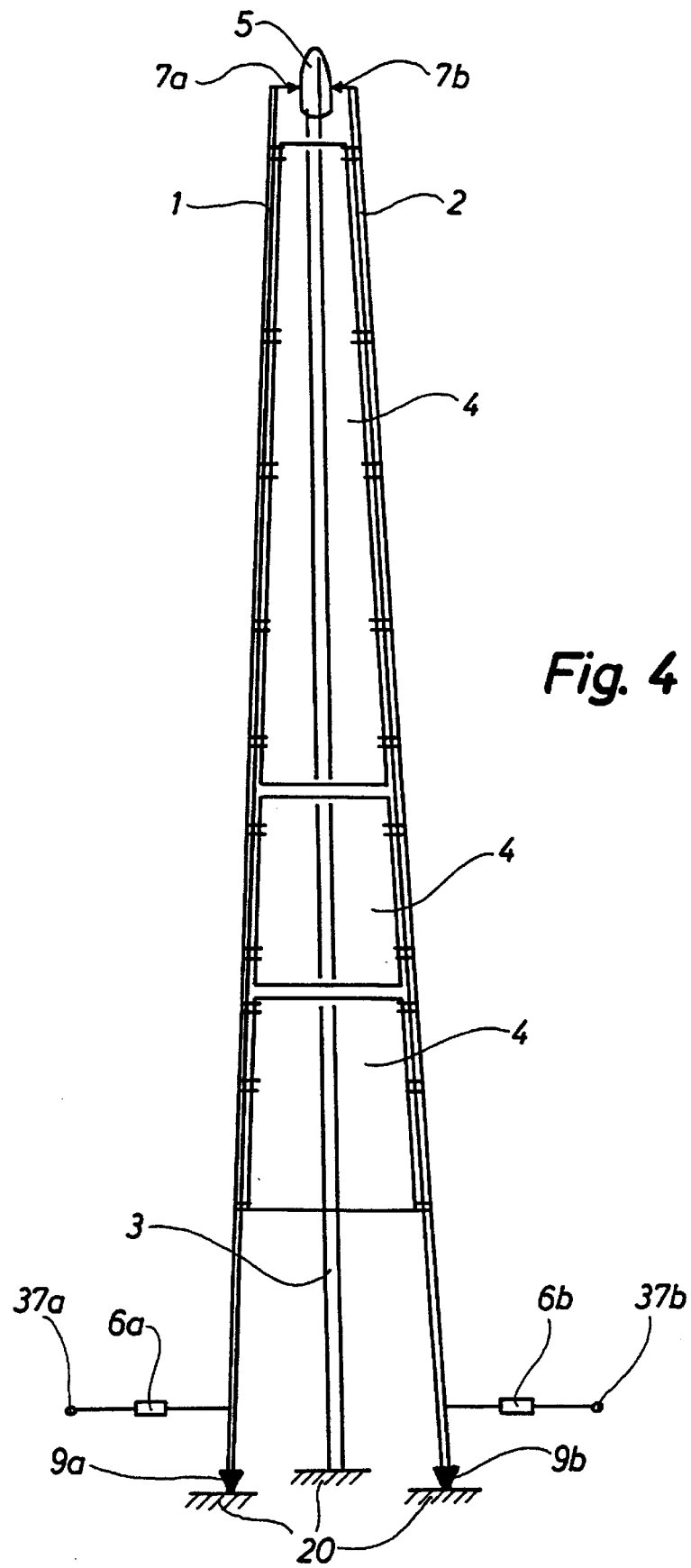
FIG. 4 is a diagrammatic view of the preferred embodiment of a wind turbine blade according to the invention.

FIG. 4 is a diagrammatic view of a preferred embodiment of portions of a wind turbine blade according to the invention. The portions illustrated are of a geometric extent corresponding to the geometric extend of the wind turbine blade, and they include a lightning receptor 5 at the tip of said wind turbine blade, a first 1, a second 2 and a third 3 electric conductor, electric heating elements 4, four spark gaps 7a, 7b, 9a, 9b and two overvoltage cutouts 6a, 6b. The lightning receptor 5, viz. the lightning conductor, is formed by a metal part exposed at the tip of the blade and capable of catching a stroke of lightning. The lightning receptor 5 is earthed 20 through the electric conductor 3. This earth connection is, of course, provided through the hub 30 and the tower 31 of the wind turbine. In the embodiment shown in FIG. 4 the device comprises three electric heating elements 4 connected to the first 1 and the second 2 conductor, respectively. The first 1 and the second 2 conductor are at the root 35 of the wind turbine blade connected through overvoltage cutouts 6a, 6b to a first current phase 37a and a second current phase 37b, respectively, of a three-phase AC supply, and through the spark gaps 9a, 9b they are connected to earth. When voltage is fed to the locations 37a, 37b, current passes through the electric heating elements 4, which in turn heat the surface of the wind turbine blade and melt the interface bond between the surface and possible ice coatings. As a result the ice coatings shed off. At the tip of the wind turbine blade, spark gaps 7a, 7b are provided between the first 1 and the second 2 conductor, respectively, and the lightning receptor 5. In case of strokes of lightning, the lightning current is immediately carried from the lightning receptor through the third 3 conductor and to earth. However, an electric arc is quickly generated in the spark gaps 7a, 7b, 9a, 9b between the lightning receptor 5 and the first 1 and the second 2 conductor, respectively, and between the first 1 and the second 2 conductor and earth, respectively, with the result that said lightning current is also carried to the earth through the first and the second conductor. The lightning current carried through the primary third conductor 3 is, however, considerably more extensive than the lightning current passing through the first 1 and the second 2 conductor. The relatively strong lightning current through the first 1 and the second 2 conductor has the effect that the overvoltage cutouts 6a, 6b interrupt the connection between the power supply 37a, 37b and the two conductors 1, 2. A correct and uniform structuring of the spark gaps and the first 1 and the second 2 conductor ensures that a uniform potential drop applies downwards through the first 1 and the second 2 conductor, and thus no damaging strong currents pass through the heating elements. In other words the total lightning current is distributed among the three conductors 1, 2, 3, and a damaging heating of the blade material and the heating elements due to the stroke of lightning can thus be avoided.

Figure 5:
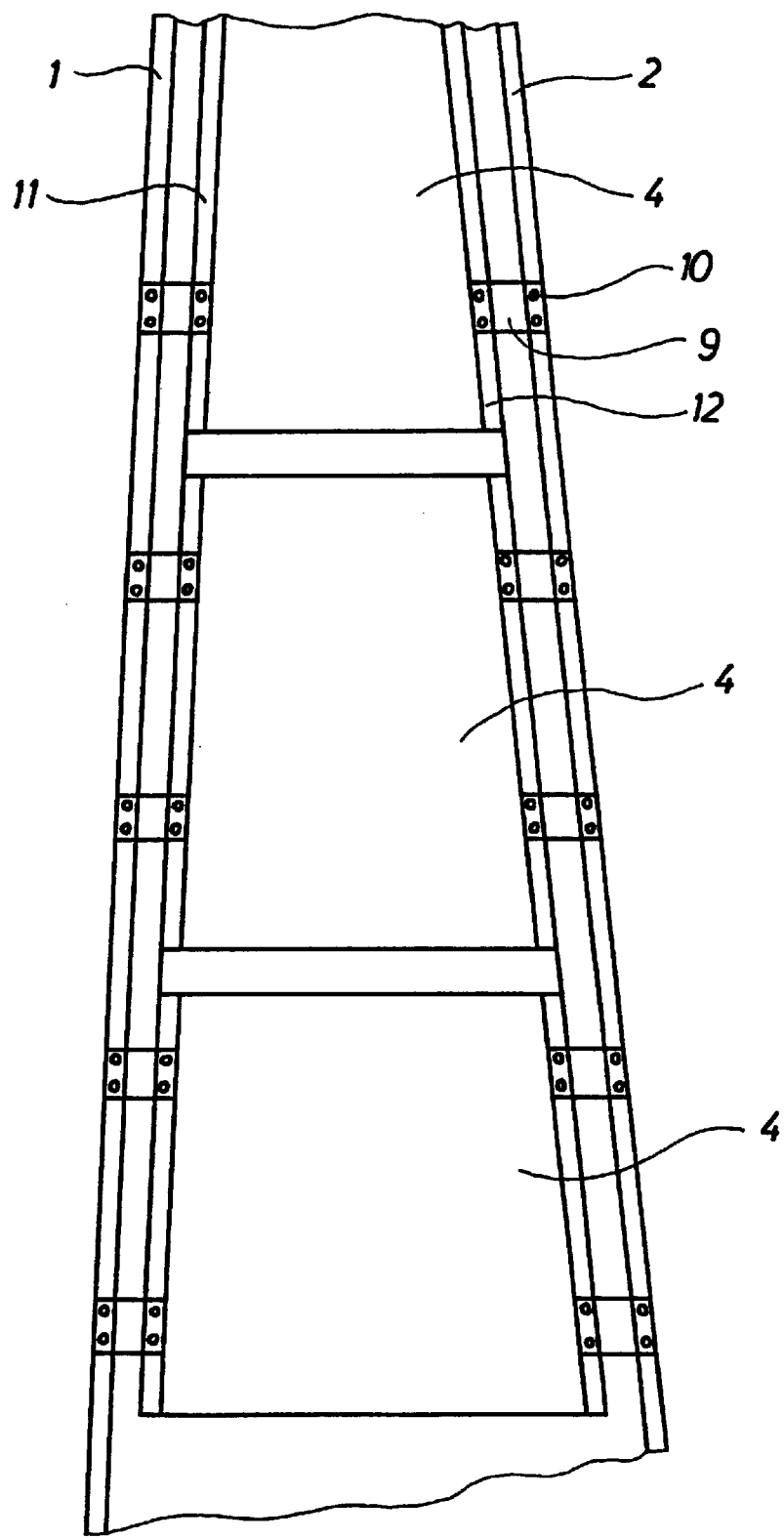
FIG. 5 illustrates on a larger scale and in greater detail a portion of the blade shown in FIG. 4.

FIG. 5 illustrates on a larger scale a portion of the blade shown in FIG. 4. The heating elements 4 are formed by thin metal foils which can carry electric current and present a suitable electric resistance. As an alternative, the heating elements can include electrically conducting carbon fibres. The terminations between the heating elements 4 and the first 1 and the second 2 conductor are here carried out by means of small plate-shaped electrically conducting members 9 and rivets 10. As an alternative, the plate-shaped members 9 can be welded onto the conductors 1, 2 and the rims of the heating elements 4. Both securing methods are advantageous in being possible from only one side, such as from the outer side of the blade.

Figure 6:
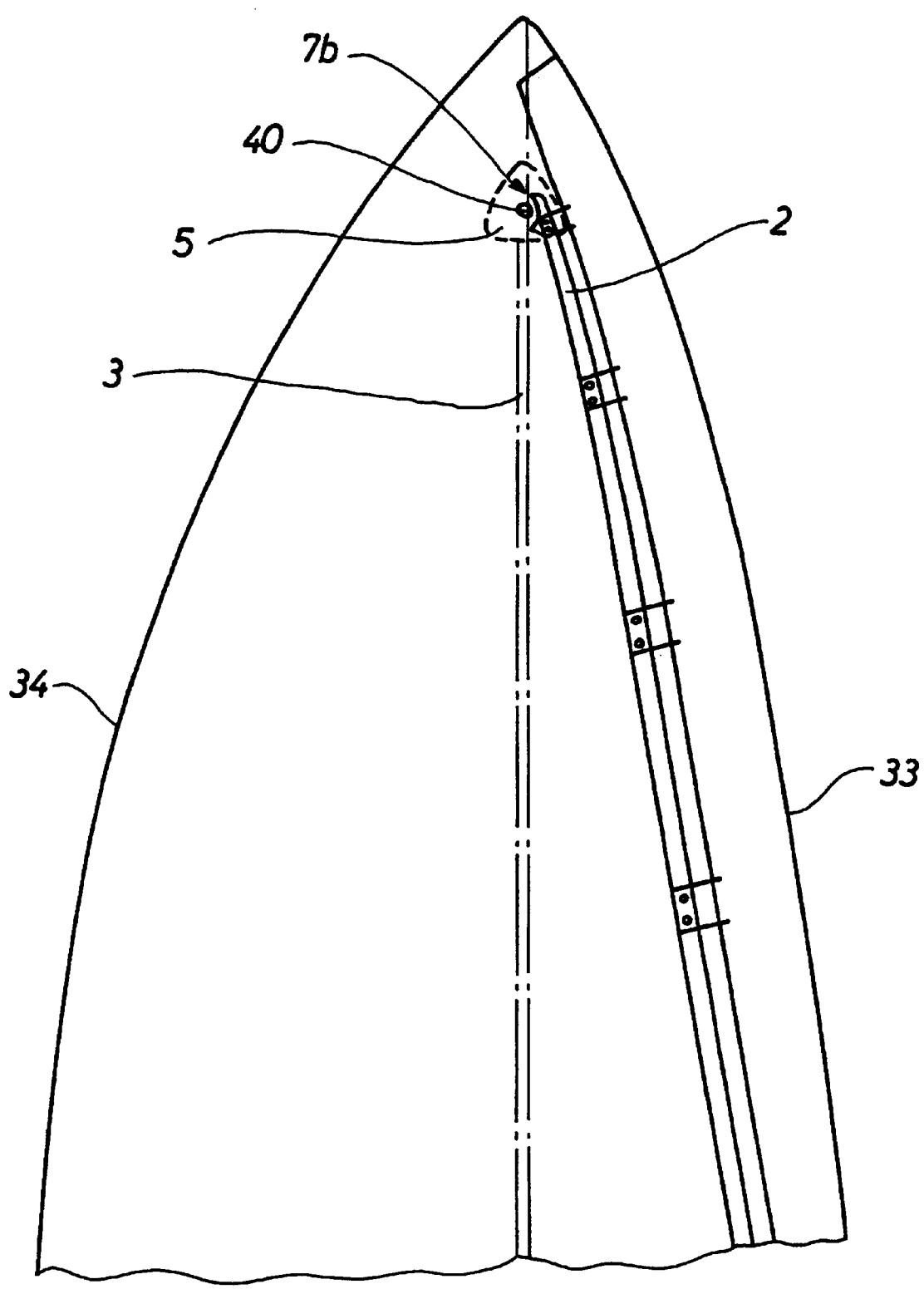
FIG. 6 illustrates the tip of a wind turbine blade according to the invention.

FIG. 6 illustrates the blade tip and the spark gap 7b between the lightning receptor 5 and the second conductor 2. The spark gap is here formed as a circular concave face at the end of the conductor 2, said face partially surrounding a rod-shaped member 40 on the lightning receptor 7.

Figure 7:
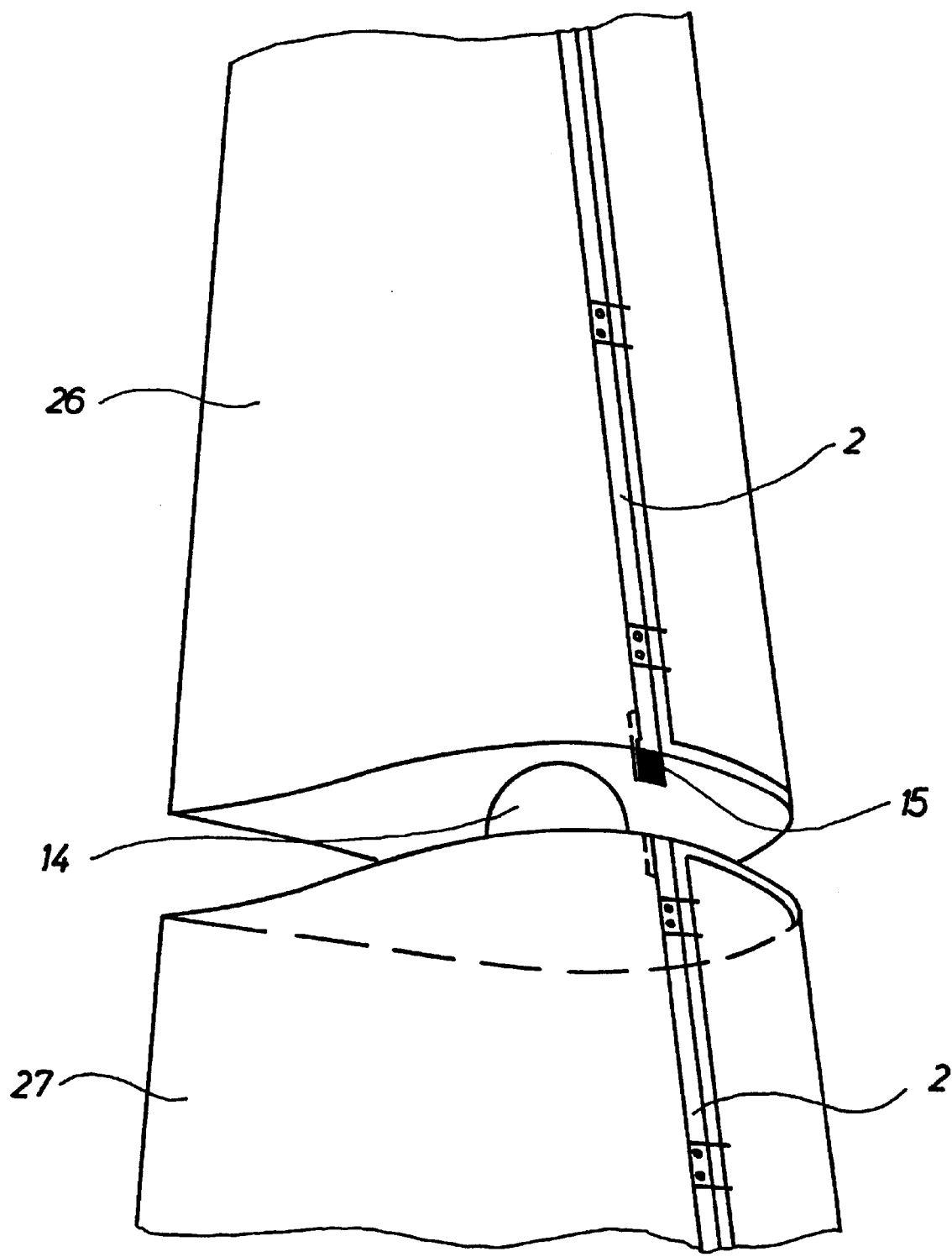
FIG. 7 illustrates a portion of a wind turbine blade with a pivotal tip according to the invention.

FIG. 7 is a sectional view of a blade with a pivotal tip 26. The tip 26 can be rotated about its longitudinal axis relative to the remaining blade 27. The pivotal connection between the tip 26 and the remaining blade 27 is provided by means of a shaft 14, typically a carbon fibre shaft, in a manner known per se and which is therefore not described in greater detail here. The electric connection between the portion of the conductors 1, 2 positioned in the tip 26 and the portion of said conductors 1, 2 positioned in the remaining portion 27 of the blade is established by means of resilient contact members 15. FIG. 7 illustrates only the second conductor 2. In the drawing, the tip 26 and consequently the contact member 15 are pulled away from the remaining portion 27 of the blade for the sake of clarity. Although it is not shown in the drawing, a spark gap is provided between the two portions of the conductors 1, 2. In case of a stroke of lightning, an electric arc is generated in this spark gap with the result that the lightning current can be carried from the tip to the earth around the contact members, which are thus not welded together due to a too strong heating. The third electric conductor 3 does not appear from FIG. 7, but it extends internally in the shaft 14. The third conductor 3 can be formed by a wire known per se which is used for controlling the tip 26.

The heating elements 4 can either be laminated into the walls of the wind turbine blade or be externally mounted on the surface, cf. FIG. 3. In the latter case, it is possible to mount the heating elements 4 in a size and number corresponding to the surface area of the blade which is desired to be heated. The front rim 33 of the blade is often particularly exposed to icing, and in FIG. 3 this front rim 3 is provided with heating elements 4, but any portion or portions of the surface can be provided with heating elements 4. In FIG. 3 these heating elements 4 have been incorrectly drawn for the sake of clarity. They can be so thin that in practice they do not change the profile of the surface. Both in case the heating elements 4 are laminated into the wall 13 of the wind turbine blade and in case said heating elements are externally mounted on said wind turbine blades, the modular structure ensures that it is possible to adapt each wind turbine to the actual climatic conditions.

The first 1 and the second 2 conductor can be arranged on the outside of the surface of the blade or be embedded in the blade wall 13. In the embodiment illustrated in FIG. 3 they are arranged in recesses in the surface. The first 1 and the second 2 conductor are preferably made of metal, but they can also be made of carbon fibre material optionally with metal coated carbon fibres.

The potential drops across both the conductor 3 arranged in the interior of the wind turbine blade, cf. FIG. 3, and the two circumferentially arranged conductors 1, 2 present when correctly established, viz. with the same inductance, the same potential across partial distances. As a result it is possible to omit potential equalizations, and it is ensured that the potential difference across the heating elements 4 is always zero during a stroke of lightning, whereby no damaging strong currents pass through said heating elements 4.

A switch relay (not shown) can be coupled between the terminal location 37a, 37b and the power supply. This relay can be connected to an ice-sensor in the surface of the wind turbine blade, whereby the relay establishes an electric connection between the power supply and the conductor 1, 2 when the ice-sensor detects ice.

The power supply is connected to the terminal locations 37a, 37b, cf. FIG. 4, and can be either a DC or an AC power supply. The power supply can either be the primary power supply of the wind turbine or be secondary power supplies arranged in the top or the bottom of the turbine or can be rotating with the blades inside said blades or inside the hub.

The electric conductors can furthermore supply power to secondary purposes, such as for a heating of shaft pipes inside blades with a tip, or for temperature sensors and transmitters of any kind requiring energy for processing signals and from which signals are transmitted downwards into the turbine by means of other techniques, such as radio waves, laser light or optical fibres.

The invention is not restricted to the above embodiments.

What is claimed is:

1. Wind turbine blade comprising a first (1) and a second (2) electric conductor extending in the longitudinal direction of the blade (25), one or more electric heating elements (4) for heating the surface of the blade, said heating elements (4) being connected to the first (1) and the second (2) conductor, characterised in that said wind turbine blade is provided with a lightning conductor system known per se and comprising a lightning receptor (5) at the tip of the wind turbine blade and a third (3) electric conductor electrically connected to said lightning receptor (5), and which is earthed at the blade root, and that the first (1) and the second (2) conductor are connected through spark gaps (7a, 7b) adjacent the lightning receptor (5) to said lightning receptor and are earthed through spark gaps (9a, 9b) at the blade root.

2. Wind turbine blade as claimed in claim 1, characterised in that the first conductor (1) adjacent the blade root is connected through an overvoltage cutout (6a) to a first current phase (37a) and that the second conductor (2) adjacent the blade root is connected to a second current phase (37b) through an overvoltage cutout (6b).

3. Wind turbine blade as claimed in claim 1, characterised in that the heating elements (4) are externally arranged on the surface of the wind turbine blade (25).

4. Wind turbine blade as claimed in claim 1, characterised in that the heating elements (4) are laminated into the wall (13) of the blade.

5. Wind turbine blade as claimed in claim 1, characterised in that the heating elements (4) are made of metal foil.

6. Wind turbine blade as claimed in claim 1, characterised in that the first (1) and the second (2) conductor are arranged in the wall (13) of the wind turbine blade, and that the third (3) conductor is inserted in a cavity in the blade.

7. Wind turbine blade as claimed in claim 1, characterised in that the heating elements (4) are arranged at the front rim of the blade (25).

8. Wind turbine blade as claimed in claim 1, characterised in that it comprises a pivotal tip (26) known per se, and that at least a portion of the first and the second conductor (1, 2) extends in the pivotal tip (26) and is connected to the portion of the same conductor (1, 2) extending in the remaining blade portion (27) through resilient contact members (15), and that spark gaps are provided parallel to each of these contact members (15) between the two portions of the same conductor (1, 2).

* * * * *